3,523,969
RESOLUTION OF SERINE PARATOLUENE-SULFONATE
Ichiro Chibata and Shigeki Yamada, Toyonaka-shi, Masao Yamamoto, Koyoto-shi, Mitsuru Wada, Osaka, and Takahiko Yoshida, Koyoto-shi, Japan, assignors to Tanabe Seiyaku Co., Ltd., Osaka, Japan, a corporation of Japan
No Drawing. Filed Jan. 30, 1967, Ser. No. 612,728
Int. Cl. C07c *143/00*
U.S. Cl. 260—501.12     7 Claims

ABSTRACT OF THE DISCLOSURE

A process for separation of the optically active components of a racemic mixture of DL-serine paratoluenesulfonate to produce D or L-serine is disclosed.

---

This invention relates to the resolution of serine paratoluenesulfonate by the selective crystallization, which provides a novel process for the preparation of optically active serine.

Naturally occurring serine is in the optically active L-form which is an important component of animal diets, whereas the enantiomorphic D-serine has no known nutritional value. However, D-serine is very useful as an intermediate for the synthesis of the antibiotic D-cycloserine. On the other hand, synthetic serine is optically inactive and consists of equal parts of the two enantiomorphic isomers. Thus the commercial value of synthetic serine could be doubled if the racemic mixture were resolved into D- and L-serine.

The most commonly used method of resolving DL-serine comprises treating an acyl-DL-serine with an optically active resolving agent such as brucine or quinine, fractionally crystallizing the resulting mixture of diastereoisomers and hydrolyzing the product. Alternatively, the N-acyl-DL-serine can be asymmetrically hydrolyzed by the action of acylase of various molds. These methods have been found to be disadvantageous as they require the use of expensive alkaloids or the preparation of the enzyme.

An object of this invention is to provide a new and improved process for the resolution of serine which can overcome the above-mentioned disadvantages. Broadly speaking, the process of this invention comprises producing a supersaturated solution of DL-serine paratoluenesulfonate in a solvent, seeding or dissolving one of the optically active components thereof in the solution; thus making it predominant over the other component in the solution, allowing the predominant component to crystallize out, and recovering it from the mother liquor.

In carrying out the process of this invention, a supersaturated solution of paratoluenesulfonic acid salt of racemic serine is prepared. This can be done by dissolving the racemic modification at an elevated temperature in the solvent, as hereinafter described, in an amount which forms a supersaturated solution when the solution is cooled, and then cooling the solution. In one embodiment of the invention, a small amount of crystals of one of the enantiomorphic components is added to the supersaturated solution as the seed and the mixture is stirred to cause selective crystallization of the enantiomorph which is the same as that which has been seeded. Alternatively, in another embodiment, a small amount of one of the enantiomorphs is added while the solution of racemic modification is hot to make the said enantiomorph dominant over the other in the solution and then cooling the solution whereby spontaneous crystallization of the enantiomorph which is the same as that which has been added takes place. A combination of these procedures is also possible. Namely, a partial amount of the crystals of one of the enantiomorphs is dissolved in the hot solution of racemic modification and the remaining part is added as the seed to the supersaturated solution in which one of the enantiomorphs is dominant over the other. In this case, the seeding amount can be minimized.

According to the present invention, any inert solvent which can dissolve DL-serine paratoluenesulfonate and which can crystallize out the compound as an agglomerate is usable in the process of selective crystallization. For example, water, alkanols having up to 6 carbon atoms or ketones having up to 6 carbon atoms, especially ethanol, n- or iso-propanol, and n- or iso-butanol are suitable for this purpose. The starting DL-serine paratoluenesulfonate may be prepared by conventional manner. For example, DL-serine paratoluenesulfonate is prepared by dissolving DL-serine in an aqueous solution of paratoluenesulfonic acid and the solution is cooled, concentrated, or is added aliphatic alcohol or ketone to decrease the solubility of the resulting salt whereby DL-serine paratoluenesulfonate is crystallized out. The preferable proportion of the enantiomorph to be added may be greater than 1% by weight of the racemic modification. The upper limit should be determined by the cost of the enantiomorph.

The temperature at which the crystallization is carried out is not critical for the invention, but it is preferred to operate at about room temperature, e.g., at about 15 to 30° C.

After the first crop of one of the enantiomorphs is filtered off, the mother liquor is used again for separating the optical antipode of the enantiomorphs. For this purpose, the mother liquor is concentrated to produce the original concentration of the enantiomorphic mixture. Alternatively, a quantity of the racemic modification which is preferably the same as the quantity of the enantiomorph previously separated is dissolved in the mother liquor at an elevated temperature. With this solution, the procedure which has been carried out in the previous operation is repeated to separate the other enantiomorph. Thus the cycle of the operation can be repeated indefinitely to successively separate each of the enantiomorphs. For the continuous resolution, it is preferable to carry out the selective crystallization under the condition, e.g., the resolution ratio of each selective crystallization steps is approximately one, which can be calculated from the following equation:

$$\left( = \frac{\text{Crystal obtained} \times \text{Optical purity thereof} - \text{Enantiomorph supplied}}{\text{Enantiomorph supplied}} \right)$$

When the crystals of optically active serine paratoluenesulfonate thus obtained are contaminated with its enantiomorphic mixture, the crude crystals may be purified by immersing them in a sufficient quantity of the solvent, as employed in the present invention, which dissolves the racemic modification in the crude crystals. By the above treatment, the crystals of 100% optical purity can be easily obtained, because the solubility of the enantiomorphic mixture is higher than that of each enantiomorph.

Optically active serine paratoluenesulfonate thus obtained can yield the corresponding optical isomers of free serine by conventional method, e.g., by neutralizing or treating with an ion-exchange resin and liberating the resulting optically active serine and recovering paratoluene sulfonic acid therefrom.

The invention is more specifically illustrated by the following examples.

EXAMPLE 1

7.50 g. of DL-serine paratoluenesulfonate and 0.50 g. of L-serine paratoluenesulfonate are dissolved in 100 ml. of isopropanol heating at 75° C. and cooled to 25° C. 0.05 g. of L-serine paratoluenesulfonate is seeded into the solution. The mixture is stirred for 1.5 hours at the same temperature. Then the resulting crystals are collected by filtration whereby 1.08 g. of L-serine paratoluenesulfonate is obtained.

$[\alpha]_D^{25} = +4.80°$ (C=2, 6 N HCl)

Optical purity is 100%.

5 g. of the crystal is dissolved in 50 ml. of distilled water and the solution is passed through a column of 50 ml. of a strong acidic ion-exchange resin (Amberlite IR-120 H-form). Then, the column is washed with water and eluted with 1 N-aqueous ammonia. The resulting eluate is concentrated to dryness and the residue is recrystallized from 80% aqueous methanol. Thus, 1.89 g. of L-serine is obtained.

$[\alpha]_D^{25} = +15.00$ (C=2, 1 N HCl)

EXAMPLE 2

7.00 g. of DL-serine paratoluenesulfonate and 0.50 g. of D-serine paratoluenesulfonate having optical purity of 93.8% are dissolved in 145 ml. of isobutanol, by heating at 80° C. and cooled at 25° C. 0.10 g. of D-serine paratoluenesulfonate is seeded into the solution. The mixture is stirred for one hour and the resulting crystals are collected by filtration. Thus, 0.74 g. of D-serine paratoluenesulfonate is obtained.

$[\alpha]_D^{25} = -4.45°$ (C=2, 6 N HCl)

Optical purity is 92.7%.

EXAMPLE 3

8.00 g. of DL-serine paratoluene sulfonate and 1.00 g. of L-serine paratoluenesulfonate (optical purity 95.8%) are dissolved in 120 ml. of n-butanol by heating and cooled at 25° C. 50 mg. of L-serine paratoluenesulfonate is seeded into the solution. The mixture is stirred for 75 minutes at the same temperature and the resulting crystals are collected by filtration. Thus, 1.68 of L-serine paratoluenesulfonate is obtained.

$[\alpha]_D^{25} = +4.25°$ (C=2, 6 N HCl)

Optical purity is 88.5%.

EXAMPLE 4

15.0 g. of DL-serine paratoluenesulfonate and 0.90 g. of D-serine paratoluenesulfonate are dissolved in 200 ml. of isopropanol by heating at 75° C. and cooled at 25° C. 0.10 g. of D-serine paratoluenesulfonate is seeded into the solution. The mixture is stirred for two hours at the same temperature and the resulting crystals are collected by filtration. Thus, 2.22 g. of D-serine paratoluenesulfonate is obtained.

$[\alpha]_D^{25} = -4.45°$ (C=2, 6 N HCl)

Optical purity is 92.7%.

EXAMPLE 5

2.06 g. of DL-serine paratoluenesulfonate is dissolved by heating in the mother liquor obtained after filtering the crystals in Example 4 and the solution is cooled to 25° C. 0.1 g. of L-serine paratoluenesulfonate is seeded into the solution. The mixture is stirred for two hours at the same temperature. The resulting crystals are collected by filtration. Thus, 2.08 of L-serine paratoluenesulfonate is obtained.

$[\alpha]_D^{25} = +4.50°$ (C=2, 6 N HCl)

Optical purity is 93.8%.

EXAMPLE 6

6.25 g. of D-serine paratoluene sulfonate (Optical purity 80.2%) is dissolved in 46.3 ml. of isopropanol by heating. The solution is allowed to stand overnight at 25° C. The resulting crystals are collected by filtration and dried whereby 5.38 g. of D-serine paratoluenesulfonate is obtained.

$[\alpha]_D^{25} = -4.80°$ (C=2, 6 N HCl)

Optical purity is 100%.

5 g. of the crystal is dissolved in 50 ml. of distilled water and the solution is passed through a column of 50 ml. of a strong acidic ion-exchange resin (Amberlite IR-120 H-form). Then the column is washed with water and is eluted with 1 N-aqueous ammonia. The resulting eluate is concentrated to dryness and the residue is recrystallized from 80% aqueous methanol. Thus, 1.86 g. of D-serine is obtained.

$[\alpha]_D^{25} = -15.00°$ (C=2, 1 N HCl)

The first effluent and the washings obtained in the above procedures are mixed and the mixture is concentrated after adding 1.88 g. of DL-serine. Then, the resulting crystals are washed with acetone and dried whereby 4.85 g. of DL-serine paratoluenesulfonate is recovered.

What we claim is:

1. A process for obtaining one enantiomorph of serine p-toluene sulfonate substantially free from the other enantiomorph from a racemic mixture thereof, which process comprises the steps of dissolving DL-serine paratoluenesulfonate in a hot solvent therefor to form a solution; adding to said solution of DL-serine paratoluene sulfonate an additional quantity of one optically active component of said DL-serine paratoluenesulfonate; cooling the solution to produce a supersaturated solution; then seeding with crystals of said one optically active component of serine paratoluenesulfonate to initiate crystallization of said optically active component from said supersaturated solution; and recovering said crystallized optically active component.

2. A process for obtaining one enantiomorph of serine p-toluene sulfonate substantially free from the other enantiomorph from a racemic mixture thereof, which process comprises the steps of producing a supersaturated solution of DL-serine paratoluenesulfonate in a solvent therefor; seeding with crystals of one optically active component of said DL-serine paratoluenesulfonate to initiate crystallization of said one optically active component from the solution; and recovering said crystallized optically active component by filtration.

3. A process for obtaining one enantiomorph of serine p-toluene sulfonate substantially free from the other enantiomorph from a racemic mixture thereof, which process comprises the steps of dissolving DL-serine paratoluene sulfonate in a hot solvent therefor to form a solution; adding to said solution of DL-serine paratoluenesulfonate an additional quantity of one optically active component of said DL-serine paratoluenesulfonate; cooling said hot solution to obtain a solution supersaturated with respect to said added optically active component; and permitting said supersaturated solution to stand whereby crystals of said added optically active component form; and recovering said crystallized optically active component.

4. A process as described in claim 1 in which the solvent is an alkanol having up to 4 carbon atoms.

5. A process as described in claim 2 in which the solvent is an alkanol having up to 4 carbon atoms.

6. A process as described in claim 3 in which the solvent is an alkanol having up to 4 carbon atoms.

7. The compound DL-serine paratoluenesulfonate.

References Cited

McChesney et al.: J.A.C.S., vol. 59, pp. 1116–1118 (1937).

Perloto et al.: Chem. Abstracts, vol. 64, columns 19756–19757 (1966).

Eliel: Stereochemistry of Carbon Compounds, McGraw-Hill, p. 48 (1962).

LEON ZITVER, Primary Examiner

M. W. GLYNN, Assistant Examiner

U.S. Cl. X.R.

260—534